US012264605B2

(12) United States Patent
Gron, Jr. et al.

(10) Patent No.: US 12,264,605 B2
(45) Date of Patent: Apr. 1, 2025

(54) SYSTEM FACILITATING CYLINDER DEACTIVATION AND 1.5-STROKE ENGINE BRAKING OPERATION IN AN INTERNAL COMBUSTION ENGINE

(71) Applicant: Jacobs Vehicle Systems, Inc., Bloomfield, CT (US)

(72) Inventors: G. Michael Gron, Jr., Windsor, CT (US); Matei Alexandru, Simsbury, CT (US); John Mandell, Vernon, CT (US); Paul M. Bovat, East Longmeadow, MA (US); Justin D. Baltrucki, Canton, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 18/528,560

(22) Filed: Dec. 4, 2023

(65) Prior Publication Data

US 2024/0183291 A1 Jun. 6, 2024

Related U.S. Application Data

(60) Provisional application No. 63/386,134, filed on Dec. 5, 2022.

(51) Int. Cl.

*F01L 13/00* (2006.01)
*F01L 9/10* (2021.01)
(Continued)

(52) U.S. Cl.

CPC ............. *F01L 13/0005* (2013.01); *F01L 9/10* (2021.01); *F01L 9/40* (2021.01); *F01L 13/06* (2013.01);
(Continued)

(58) Field of Classification Search

CPC . F01L 9/10; F01L 9/40; F01L 13/0005; F01L 13/06; F01L 2760/00; F02D 13/0203; F02D 13/04; F02D 13/06
See application file for complete search history.

(56) References Cited

U.S. PATENT DOCUMENTS

| | | | |
|---|---|---|---|
| 9,790,824 | B2 | 10/2017 | Baltrucki et al. |
| 11,162,438 | B2 | 11/2021 | Baltrucki et al. |

(Continued)

FOREIGN PATENT DOCUMENTS

| | | | |
|---|---|---|---|
| GB | 2562268 A | * 11/2018 | ................ F01L 1/26 |
| JP | S5941640 U | 3/1984 | |

OTHER PUBLICATIONS

International Search Report for International application No. PCT/IB2023/062217; mailed on Mar. 5, 2024; 3 pages.

(Continued)

*Primary Examiner* — Audrey B. Walter
(74) *Attorney, Agent, or Firm* — Jordan IP Law LLC

(57) ABSTRACT

A valve actuation system comprises a cylinder deactivation controller operatively connected to and in fluid communication with intake and exhaust deactivators for at least one cylinder. The valve actuation system further comprises an engine braking controller operatively connected to and in fluid communication with the engine braking actuators for the at least one cylinder. A braking-dependent deactivator controller is disposed between and in fluid communication with the cylinder deactivation controller and the intake deactivators, and in fluid communication with the engine braking controller via a control input. The braking-dependent deactivator controller is configured, in a first state based on its control input, to permit hydraulic fluid flow in hydraulic fluid control passages for the intake deactivators when in a non-1.5-stroke engine braking mode and, in a
(Continued)

second state, to vent the hydraulic fluid control passages for the intake deactivators when in a 1.5-stroke engine braking mode.

20 Claims, 8 Drawing Sheets

(51) Int. Cl.

| | |
|---|---|
| ***F01L 9/40*** | (2021.01) |
| ***F01L 13/06*** | (2006.01) |
| ***F02D 13/02*** | (2006.01) |
| ***F02D 13/04*** | (2006.01) |
| ***F02D 13/06*** | (2006.01) |

(52) U.S. Cl.
CPC ......... *F02D 13/0203* (2013.01); *F02D 13/04* (2013.01); *F02D 13/06* (2013.01); *F01L 2760/00* (2013.01)

(56) References Cited

U.S. PATENT DOCUMENTS

| | | | | |
|---|---|---|---|---|
| 11,181,018 | B1 * | 11/2021 | Erickson ............... | F01L 1/2411 |
| 2019/0040802 | A1 * | 2/2019 | Lilly ..................... | F01L 13/065 |
| 2021/0310425 | A1 | 10/2021 | Baltrucki et al. | |

OTHER PUBLICATIONS

Written Opinion of the International Searching Authority for International application No. PCT/IB2023/062217; mailed on Mar. 5, 2024; 4 pages.

* cited by examiner

SYSTEM FACILITATING CYLINDER DEACTIVATION AND 1.5-STROKE ENGINE BRAKING OPERATION IN AN INTERNAL COMBUSTION ENGINE

FIELD

The instant disclosure relates generally to internal combustion engines and, in particular, to a valve actuation system for facilitating cylinder deactivation and 1.5-stroke engine braking operation in such engines.

BACKGROUND

FIG. 1 is a partial schematic illustration of an internal combustion engine 100 including a cross-sectional view of an engine cylinder 102 and related valve actuation systems in accordance with prior art techniques. Although a single cylinder 102 is illustrated in FIG. 1, this is only for ease of illustration and it is appreciated that internal combustion engines often include multiple such cylinders driving a crankshaft (not shown). The engine cylinder 102 has disposed therein a piston 104 that reciprocates upward and downward repeatedly during both positive power operation (i.e., combustion of fuel to drive the piston 104 and the drivetrain) and engine braking operation (i.e., use of the piston 104 to achieve air compression and absorb power through the drivetrain) of the cylinder 102. At the top of each cylinder 102, there may be at least one intake valve 106 and at least one exhaust valve 108. The intake valve(s) 106 and the exhaust valve(s) 108 are opened and closed to provide communication with an intake gas passage 110 and an exhaust gas passage 112, respectively. Valve actuation forces to open the intake valve 106 and exhaust valve 108 are conveyed by respective valve trains 114, 116. In turn, such valve actuation forces (illustrated by the dashed arrows) may be provided by respective main and/or auxiliary motion sources 118, 120, 122, 124 such as rotating cams. As used herein, the descriptor "main" refers to so-called main event engine valve motions, i.e., valve motions used during positive power generation, whereas the descriptor "auxiliary" refers to other engine valve motions for purpose other than positive power generation (e.g., compression-release (CR) braking, bleeder braking, cylinder decompression, brake gas recirculation (BGR), etc.) or in addition to positive power generation (e.g., internal exhaust gas recirculation (IEGR), variable valve actuations (VVA), Miller/Atkinson cycle, swirl control, etc.).

Generally, CR engine braking occurs when an engine's cylinders are operated in an unfueled state to essentially act as air compressors, thereby providing vehicle retarding power through the vehicle's drive train. So-called 2-stroke or high power density CR braking provides for two CR events for each cycle of the engine (where a cycle for a given cylinder comprises intake, compression, expansion, exhaust strokes of the corresponding piston 104), which provides increased retarding power as compared to conventional CR systems where only a single CR event is provided for each cycle of the engine. 2-stroke CR engine braking requires that the main intake and exhaust valve actuation motions be "lost" (i.e., not conveyed to the engine valves 106, 108) in favor of the auxiliary valve actuation motions that implement the high power density engine braking. In order to implement 2-stroke CR engine braking, valve actuation systems typically incorporate cylinder deactivation (CDA) systems, which operate to decouple the intake and exhaust valves 106, 108 from their respective valve actuation motion sources 118, 120, 122, 124 thereby effectuating the noted discontinuation of main intake and exhaust valve events.

In the context of FIG. 1, lost motion components 126, 128, referred to herein as "deactivators," are provided in the respective intake and exhaust valve trains 114, 116 to effectuate cylinder deactivation. Each deactivator 130, 132 is controlled by a corresponding deactivator controller 130, 132 that, in turn, is controlled by an engine controller 134. The engine controller 134 may comprise any electronic, mechanical, hydraulic, electrohydraulic, or other type of control device for communicating with and controlling operation of the deactivator controllers 130, 132. For example, the engine controller 134 may be implemented by a microprocessor and corresponding memory storing executable instructions used to implement the required control functions, as known in the art. It is appreciated that other functionally equivalent implementations of the engine controller 134, e.g., a suitable programmed application specific integrated circuit (ASIC) or the like, may be equally employed. Likewise, it is known in the art to implement such deactivators using a hydraulically-controlled lost motion component that may be switched between an active/locked/un-collapsed state where engine valve actuation are conveyed to the engine valves, and an inactive/unlocked/collapsed state where valve actuation motions are not conveyed to the engine valves, thereby effectively deactivating the corresponding cylinder.

An example of such a hydraulically-controlled lost motion component is illustrated and described in U.S. Pat. No. 9,790,824 (the "'824 patent"), owned by the same assignee as the instant application, which describes a locking mechanism that is normally in a locked/un-collapsed or motion-conveying state, and that switches to an unlocked/collapsed or motion-absorbing state when hydraulic fluid is applied. Further, each locking mechanism described in the '824 patent may be applied to individual engine valves (e.g., in a rocker arm actuating a single engine valve) or multiple engine valves (e.g., in a valve bridge used to actuate two or more engine valves). When hydraulically-controlled deactivators are employed, the deactivator controllers 130, 132 are typically implemented using a high-speed solenoid controlling flow of hydraulic fluid (e.g., motor oil) to the hydraulically-controlled deactivators.

Given the common feature of requiring decoupling of main intake and exhaust valve events, valve actuation systems providing both 2-stroke HPD CR engine braking and CDA operation may be readily conceived.

However, compatibility of CDA operation with other types of CR engine braking is not as readily achieved. For example, in so-called 1.5-stroke CR engine braking systems, the main exhaust event is deactivated; however, main intake valve events are not deactivated, and no additional intake lift events are provided to support a second CR event. That is, the normal, main intake valve event is provided for a first CR event, and gases used in the second compression-release event are generated solely by the recirculation of exhaust manifold gases, without drawing air from the intake manifold. Thus, valve actuation systems that simultaneously provide CDA operation for both exhaust and intake valves are often incompatible with 1.5-stroke CR engine braking given the need to only eliminate main exhaust events but not main intake events.

To facilitate the compatibility of CDA and 1.5-stroke CR engine braking, U.S. Pat. No. 11,162,438 ("the '438 patent"), owned by the same assignee as the instant application, teaches the provision of a "blocking system" to selectively prevent disablement of main intake valve events during 1.5-stroke CR engine braking. In a particular embodiment, such a blocking system is implemented by spool valves provided in conjunction with "CDA mechanisms" or deactivators disposed within the intake valve train for each cylinder of an engine. During CDA operation of the engine, each of the spool valves is operated to permit hydraulic fluid flow to and actuation of the deactivator associated with the intake valves, thereby permitting deactivation of the intake valves. However, when 1.5-stroke CR engine braking operation is required, in addition to operation of the CDA system needed to disable main exhaust valve events, the spool valves are controlled to inhibit operation of the deactivators associated with the intake valve, i.e., to block the flow of hydraulic fluid to and actuation of the deactivators associated with the intake valves.

While the '438 patent provides a viable solution for the provision of 1.5-stroke CR engine braking, further improvements would be desirable. For example, the addition of spool valve assemblies to the intake valve trains of each cylinder adds to the cost, complexity and weight of a given engine. Furthermore, even in those instances in which flow paths to intake-associated deactivators are blocked by the spool valves taught by the '438 patent, there is the possibility that hydraulic fluid trapped between the spool valves and the intake deactivators may remain sufficiently pressurized during 1.5-stroke CR engine braking to still permit actuation of the intake deactivators, which would disable main intake valve events during 1.5-stroke CR engine braking. This, in turn, could degrade performance of the 1.5-stroke CR engine braking operation.

SUMMARY

The instant disclosure concerns valve actuation systems facilitating cylinder deactivation operation and 1.5-stroke engine braking operation in an internal combustion engine having at least one cylinder, and where each of the at least one cylinder comprises at least one intake valve and corresponding hydraulically-controlled intake deactivator, at least one exhaust valve and corresponding hydraulically-controlled exhaust deactivator and a hydraulically-controlled engine braking actuator. Such valve actuation systems comprise a cylinder deactivation controller operatively connected to and in fluid communication with the intake deactivators and the exhaust deactivators for the at least one cylinder. Further, such valve actuation systems comprise an engine braking controller operatively connected to and in fluid communication with the engine braking actuators for the at least one cylinder. A braking-dependent deactivator controller is disposed between and in fluid communication with the cylinder deactivation controller and the intake deactivators, and in fluid communication with the engine braking controller via a control input of the braking-dependent deactivator controller. In an embodiment, the braking-dependent deactivator controller is configured, in a first state according to hydraulic fluid selectively applied to the control input by the engine braking controller, to permit hydraulic fluid flow in hydraulic fluid control passages for the intake deactivators when in a non-1.5-stroke engine braking mode. Further this embodiment, the braking-dependent deactivator controller is also configured, in a second state according to hydraulic fluid selectively applied to the control input by the engine braking controller, to vent the hydraulic fluid control passages for the intake deactivators when in a 1.5-stroke engine braking mode.

In an embodiment, the cylinder deactivator controller and the engine braking controller may comprise normally off solenoids.

In an embodiment, the braking-dependent deactivator controller comprises a spool valve configured to operate in a first position in which fluid communication is provided between the cylinder deactivation controller and the intake deactivators, and further configured to operate in a second position in which the intake deactivators are in fluid communication with a vent passage, where the vent passage may comprise a central bore formed in the spool valve. In an another embodiment, the spool valve may comprise a spool slidably disposed in a spool valve bore, where the spool valve bore is in fluid communication with the cylinder deactivator controller via a first hydraulic passage and in fluid communication with the intake deactivators via a second hydraulic passage having an offset alignment with the first hydraulic passage. In this embodiment, the spool valve bore may further be in fluid communication with the vent passage such that, when the spool is operated in first position, fluid communication is provided between the first and second hydraulic passages while the vent passage is occluded and, when the spool is operated in the second position, fluid communication is provided between the second hydraulic passage and the vent passage while the first hydraulic passage is occluded.

In an embodiment, the intake deactivators and exhaust deactivators may comprise normally locked/motion conveying lost motion components. Further to this embodiment, the engine braking actuators may comprise normally unlocked/motion absorbing lost motion components.

In yet another embodiment, an engine controller is operatively coupled to the cylinder deactivation controller and the engine braking controller, and operative, when initiating the 1.5-stroke engine braking mode, to cause activation of the cylinder deactivation controller no earlier than activation of the engine braking controller. Further to this embodiment, the engine controller may be further operative, when initiating the 1.5-stroke engine braking mode, to cause activation of the cylinder deactivation controller after activation of the engine braking controller.

These and other features of the instant disclosure will be apparent with reference to the detailed description below.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

As used herein, phrases substantially similar to "at least one of A, B or C" are intended to be interpreted in the disjunctive, i.e., to require A or B or C or any combination thereof unless stated or implied by context otherwise. Further, phrases substantially similar to "at least one of A, B and C" are intended to be interpreted in the conjunctive, i.e., to require at least one of A, at least one of B and at least one of C unless stated or implied by context otherwise. Further still, the term "substantially" or similar words requiring subjective comparison are intended to mean "within manufacturing tolerances" unless stated or implied by context otherwise.

As used herein, the phrase "operatively connected" refers to at least a functional relationship between two elements and may encompass configurations in which the two elements are directed connected to each other, i.e., without any intervening elements, or indirectly connected to each other, i.e., with intervening elements.

A feature of the instant disclosure is the use of a braking-dependent deactivator controller to selectively vent hydraulic passages used to control operation of intake deactivators. A characteristic of the braking-dependent deactivator controller is that it is operated under the control of an engine braking controller and is configured to either permit the flow of hydraulic fluid to intake deactivators in first state, or to permit venting of hydraulic passages leading to the intake deactivators in a second state.

Figure 2:
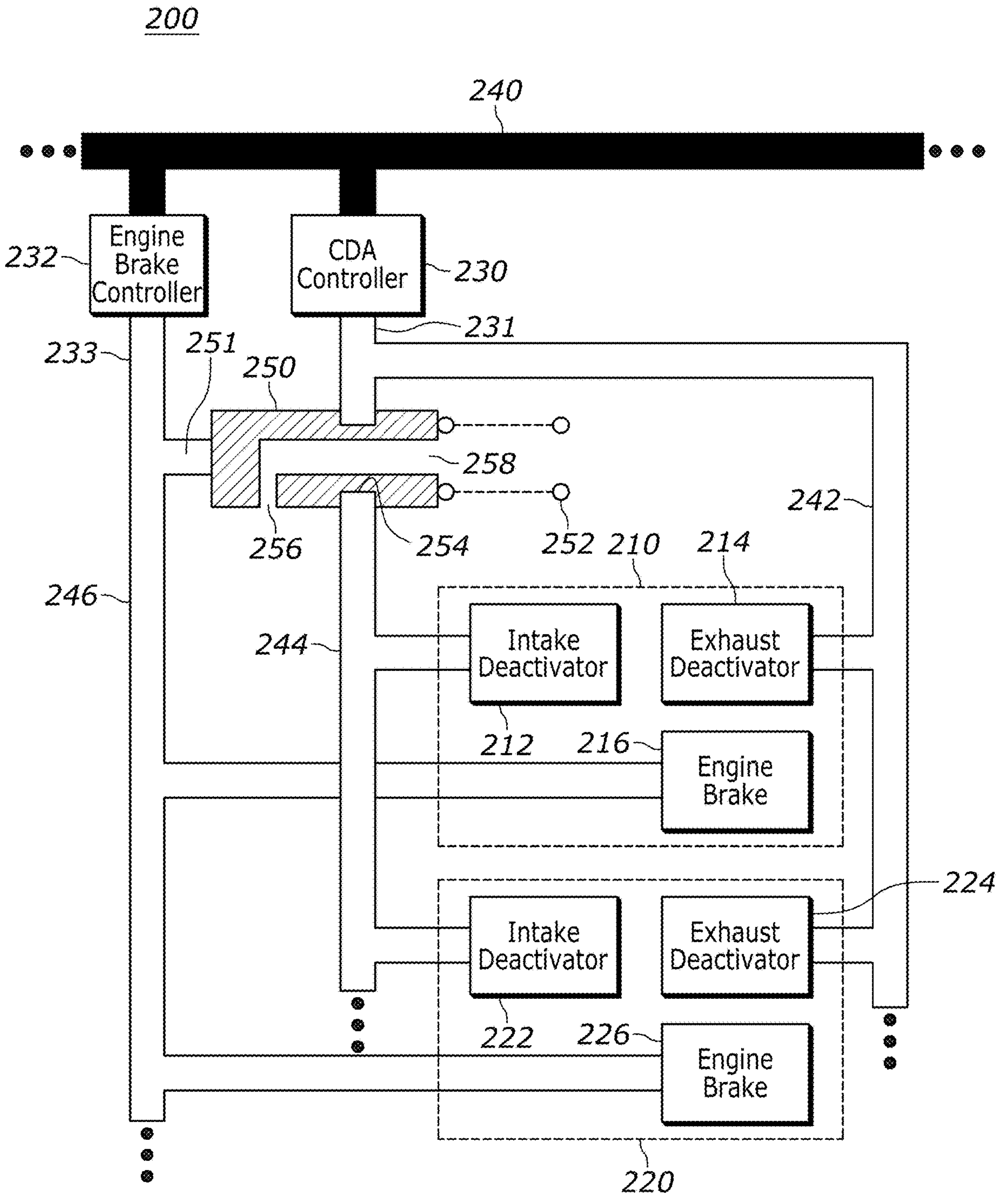
FIGS. 2-5 schematically illustrate a valve actuation system comprising a braking-dependent deactivator controller in accordance with the instant disclosure.
Figure 3:
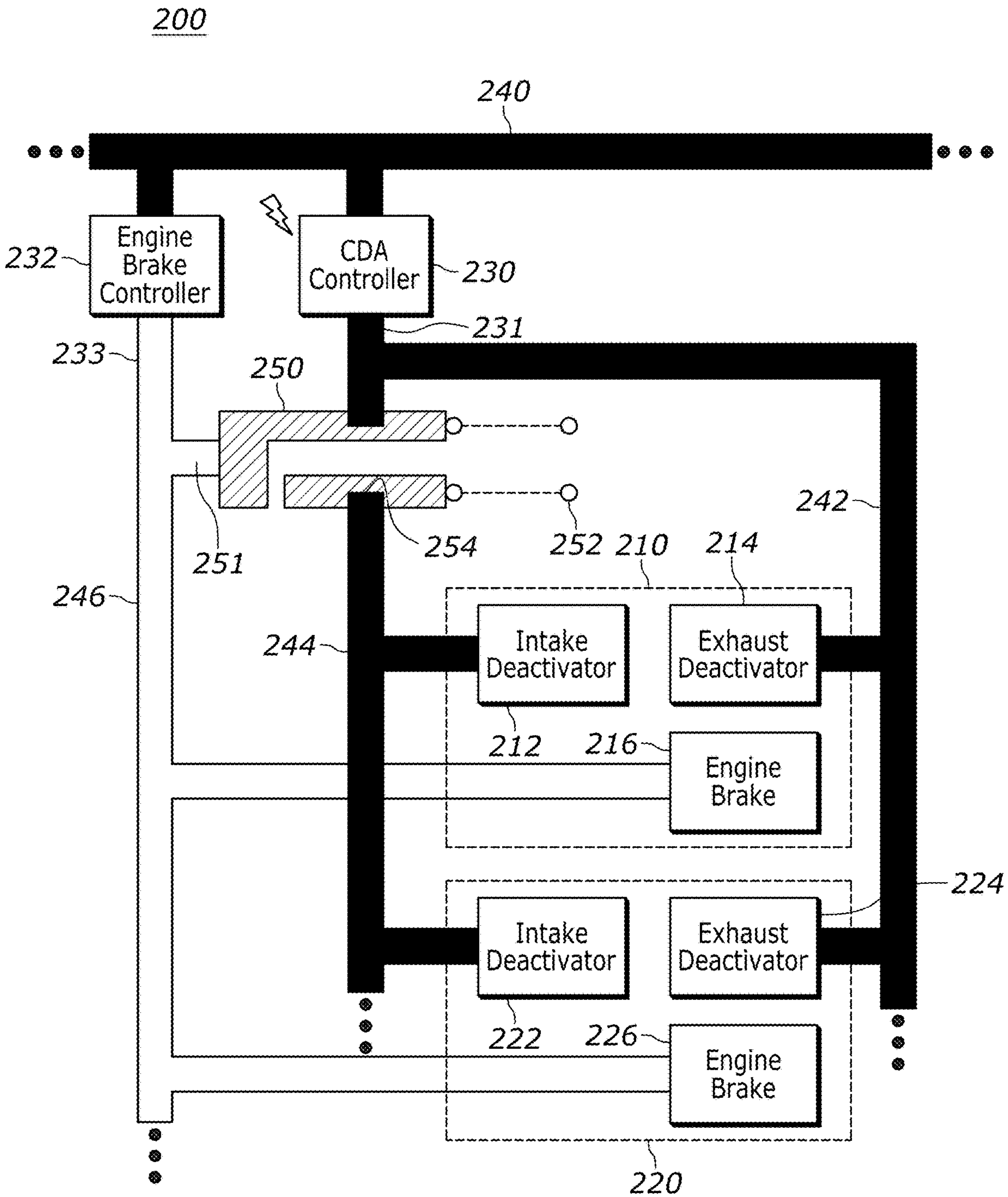
Figure 4:
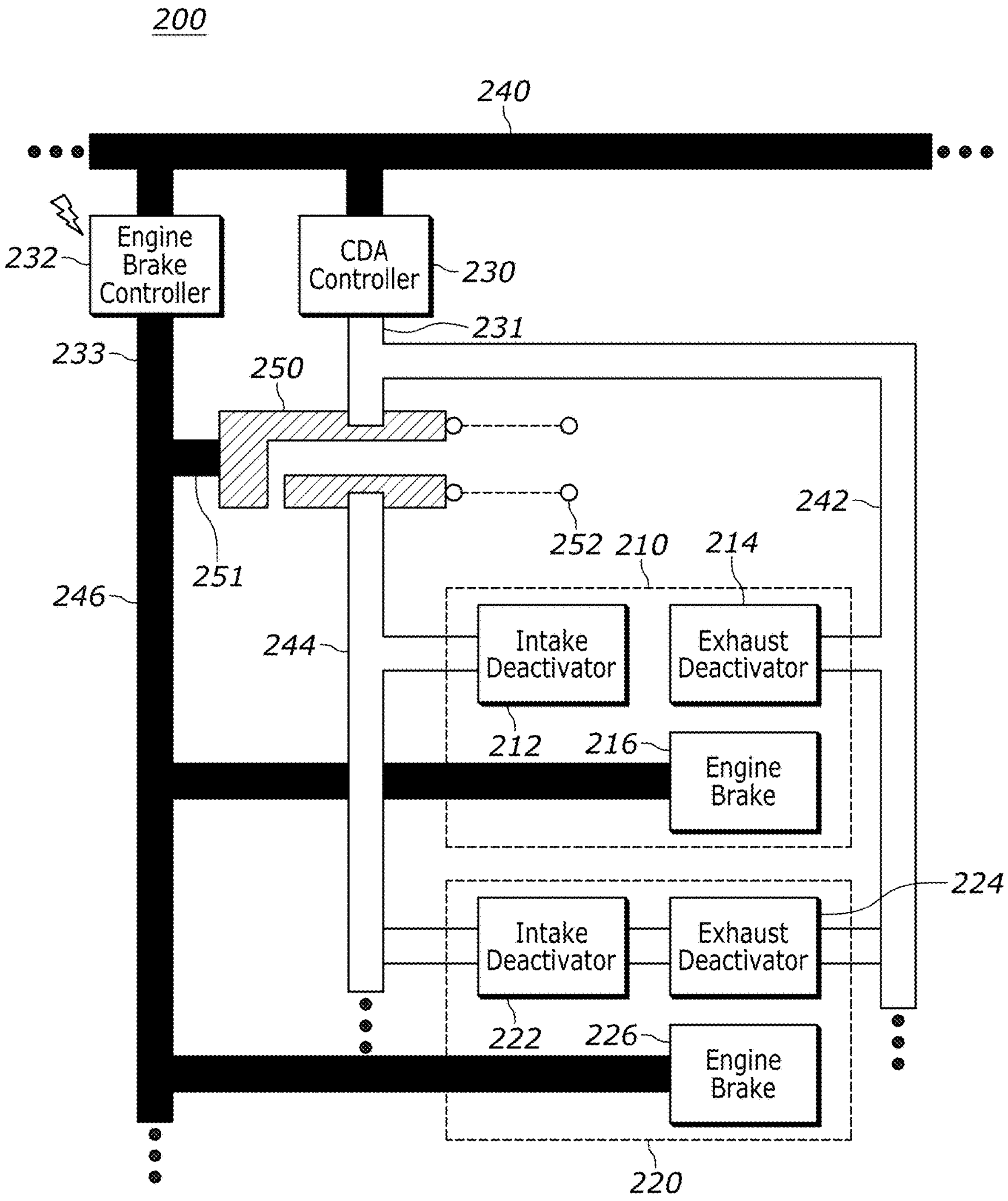

FIGS. 2-4 schematically illustrate a valve actuation system 200 featuring a braking-dependent deactivator controller in the form of a vented spool valve 250. In particular, the valve actuation system 200 comprises intake deactivators 212, 222, exhaust deactivators 214, 224 and engine brake actuators 216, 226 respectively corresponding to a plurality of engine cylinders 210, 220. Though not shown in FIGS. 2-4, each of the illustrated cylinders 210, 220 comprises one or more intake valves and one or more exhaust valves. As known in the art, the intake deactivators 212, 222 may be configured and deployed to operate on the one or more intake valves, and the exhaust deactivators 214, 224 may be configured and deployed to operate on the one or more exhaust valves. Furthermore, each of the engine brake actuators 216, 226 may be configured and deployed to operate on at least one exhaust valve.

Generally, the intake deactivators 212, 224, exhaust deactivators 216, 226 and engine brake actuators 216, 226 may be lost motion components of the type described in the '824 patent, i.e., that are hydraulically controlled to be in a locked or motion conveying state in which the lost motion component is maintained in a rigid state (while accounting for any desired lash spaces) such that valve actuation motions applied thereto are conveyed by the lost motion component, or hydraulically controlled to be in an unlocked or motion absorbing state in which the lost motion component is maintained in a compliant state such that valve actuation motions applied thereto are absorbed (i.e., not conveyed) by the lost motion component. Furthermore, as known in the art, such lost motion components (including those taught in the '824 patent) may be configured in a normally locked/motion conveying state or a normally unlocked/motion absorbing state. That is, in the absence of application of a control input (e.g., hydraulic fluid) for activation, lost motion components of the former type are maintained in their locked/motion conveying state whereas lost motion components of the latter type are maintained in their unlocked/motion absorbing state. Given this distinction, in one example embodiment, the intake and exhaust deactivators 212, 224, 214, 224 may be implemented using normally locked/motion conveying lost motion components whereas the engine braking actuators 216, 226 may be implemented using normally unlocked/motion absorbing lost motion components. In this manner, the default state of engine is for CDA operation and engine braking operation to be disabled, while normal positive power generation operation is enabled.

Figure 1:
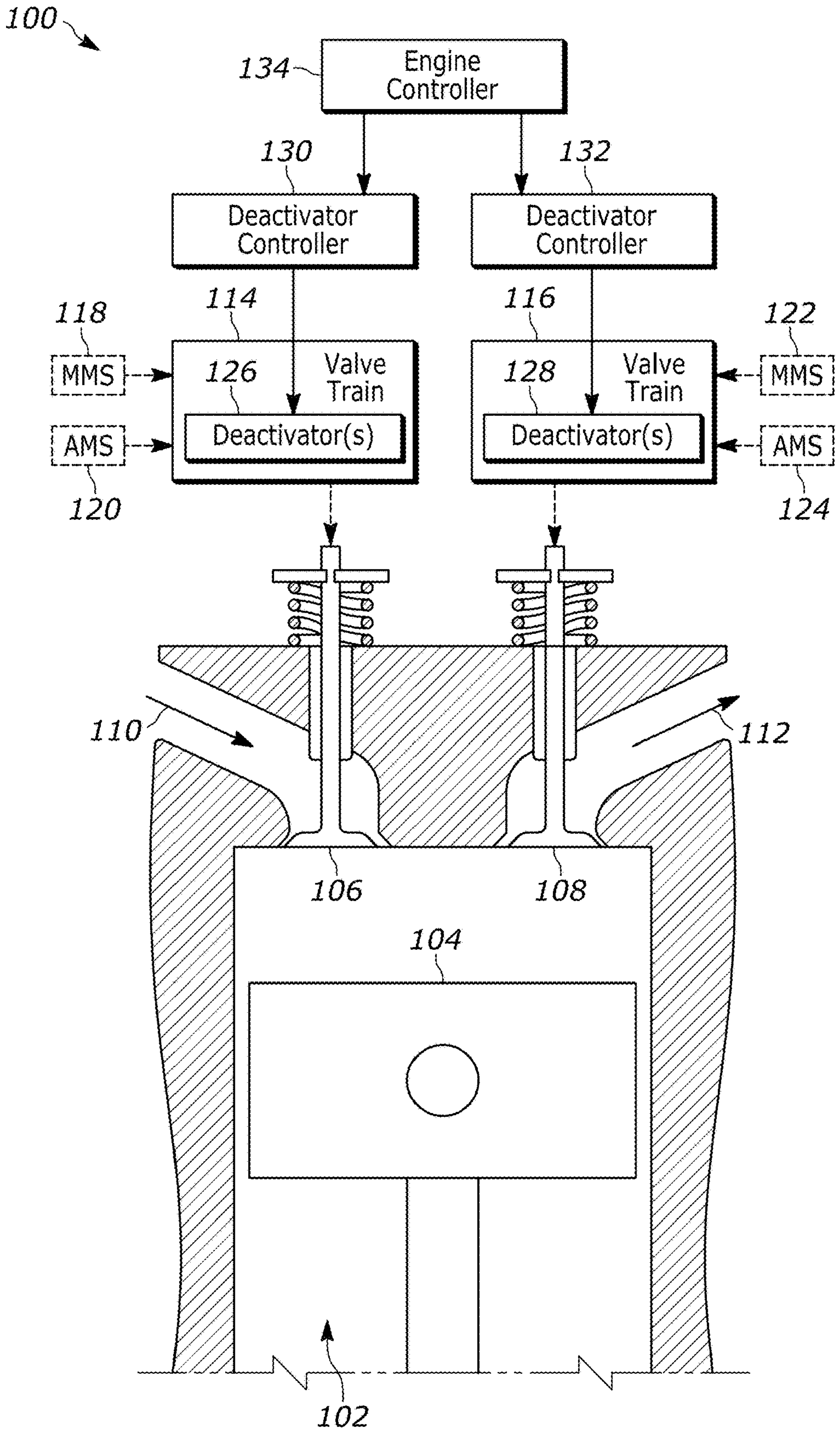
Prior Art FIG. 1
FIG. 1 is a schematic, partial cross-sectional illustration of an internal combustion engine illustrating typical deployment of deactivators and deactivator controllers in accordance with prior art techniques.

Operation of the intake and exhaust deactivators 212, 224, 214, 224 is controlled by a CDA controller 230, whereas operation of the engine brake actuators 216, 226 is controlled by an engine brake controller 232. For example, where the intake and exhaust deactivators 212, 224, 214, 224 and the engine brake actuators 216, 226 are hydraulically controlled lost motion components (such as those taught in the '824 patent), the CDA controller 230 and engine brake controller 232 may each comprise a high-speed solenoid operating under the control of an engine controller (FIG. 1). In such an embodiment, the controllers 230, 232 are operatively connected to a pressurized hydraulic fluid source 240, such as an engine oil pump and engine oil distribution network. An output port 231 of the CDA controller 230 is operatively connected to an exhaust deactivator hydraulic manifold or passages 242 and an intake deactivator hydraulic manifold or passages 244. As shown, a selectable, vented spool valve 250 is interposed between the CDA controller 230 and the intake deactivator hydraulic manifold 244. Also, an output port 233 of the engine brake controller 232 is operatively connected to an engine brake hydraulic manifold or passages 246. In an embodiment, each of the controllers 230, 232 operates to be in a normally off state in which hydraulic fluid from the hydraulic fluid source 240 is not allowed to flow into the exhaust deactivator hydraulic manifold 242, the intake deactivator hydraulic manifold 244 or the engine brake hydraulic manifold 246.

The spool valve 250 is biased into a default or first position (leftward, as shown in FIG. 2) by a spool valve spring 252. The spool valve 250 is also operatively connected to and in fluid communication with the engine braking hydraulic manifold 246 (and the engine braking controller 232) via a control input 251 opposite the spool valve spring 252. In this manner, as described in further detail below, the presence of pressurized hydraulic fluid in the engine braking hydraulic manifold 246 can overcome the bias applied by the spool valve spring 252, thereby causing the spool valve 250 to translate (rightward, as shown in FIG. 1; see FIG. 4) to an activated or second position. The spool valve 250 comprises as least one annular port 254 defined on an outer surface of the spool valve 250, as well as at least one venting port 256 defining a hydraulic passage between the outer surface of the spool valve 250 and a vent channel 258 interiorly defined as a central bore in the spool valve. In an embodiment, the vent channel 258 is open to space defined, for example, in an valve overhead. In the default position of the spool valve 250, as shown in FIG. 2, the annular port 254 is aligned with the exhaust deactivator hydraulic manifold 242 and the intake deactivator hydraulic manifold 244, thereby providing fluid communication between the two. On the other hand, in the activated position of the spool valve 250, the venting port 256 is aligned only with the intake deactivator hydraulic manifold 244, whereas the exhaust deactivator hydraulic manifold 244 is sealed off where it meets with spool valve 250 (FIG. 4).

Configured in this manner, the valve actuation system 200 may be controlled to provide various desired operating modes according to the operating states of the CDA and engine braking controllers 230, 232 as commanded by the engine controller. As depicted in FIG. 2, both the CDA controller 230 and engine brake controller 232 are controlled to remain in their off (preferably, default)state such that hydraulic fluid from the hydraulic fluid source 240 is not permitted to flow into the respective intake deactivator hydraulic manifold 244, exhaust deactivator hydraulic manifold 244 or engine brake hydraulic manifold 246. As a result, both the intake and exhaust deactivators 212, 224, 214, 224 remain in their default locked/motion conveying state such that main valve actuation motions are conveyed to the respective intake and exhaust valves. Likewise, the engine brake actuators 216, 226 are also permitted to remain in their default unlocked/motion absorbing state such that no high power density engine brake valve actuation motions are conveyed to the exhaust valve(s). In this manner, the valve actuation system 200 is configured to provide positive power generation operation of the engine.

When CDA operation of the engine is desired, the CDA controller 230 may be activated (energized) whereas the engine brake controller 232 remains inactivated (unenergized) as depicted in FIG. 3. As shown, this permits hydraulic fluid to flow from the hydraulic supply source 240 and out of the output port 231 of the CDA controller 230. In turn, hydraulic fluid flows into the exhaust hydraulic fluid manifold 242 and across the annular port 254 of the spool valve 250 (which remains in its default position) into the intake hydraulic fluid manifold 244. The presence of pressurized hydraulic fluid in the exhaust hydraulic fluid manifold 242 and the intake hydraulic fluid manifold 244 controls the respective intake deactivators 212, 222 and exhaust deactivators 214, 224 to switch to their unlocked/motion absorbing states such valve actuation motions (e.g., main valve actuations) that might otherwise be conveyed by such lost motion components are instead absorbed and lost. In this manner, the valve actuation system 200 is configured to provide CDA operation of the engine.

When 1.5-stroke CR engine braking operation of the engine is desired, both the engine braking controller 232 and CDA controller 230 are activated (energized). Generally, it is desirable to activate the engine braking controller 232 and CDA controller 230 in a manner so as to avoid deactivation of the intake valves at the same time as activation of the engine braking actuators 216, 226. For purposes of illustration, activation of the engine braking controller 232 and CDA controller 230 is shown in a sequential manner in FIGS. 4 and 5, i.e., the engine braking controller 232 is activated and the CDA controller 230 is activated thereafter. However, this is not a requirement and, in some embodiments, the engine braking controller 232 and CDA controller 230 are activated substantially simultaneously (within manufacturing tolerances) or, in any event, such that the CDA controller 230 is not activated earlier than the engine braking controller 232.

Thus, the engine brake controller 232 may be first activated (energized) whereas the CDA controller 232 remains inactivated (unenergized) as depicted in FIG. 4. As shown, this permits hydraulic fluid to flow from the hydraulic supply source 240 and out of the output port 233 of the engine brake controller 232. In turn, hydraulic fluid flows into the engine brake hydraulic fluid manifold 246. The presence of pressurized hydraulic fluid in the engine brake hydraulic fluid manifold 246 controls the engine brake actuators 216, 226 to switch to their locked/motion conveying states such valve actuation motions (e.g., 1.5-stroke CR engine braking valve actuations) that might otherwise be lost by such lost motion components are instead conveyed to their respective exhaust valves. Simultaneously, the presence of pressurized hydraulic fluid in the engine brake hydraulic fluid manifold 246 is applied to the control input 251 of the spool valve 250, thereby initiating transition of the spool valve from its default position to its activated position. As depicted in FIG. 4, the spool valve 250 has not yet transitioned to its activated position.

Figure 5:
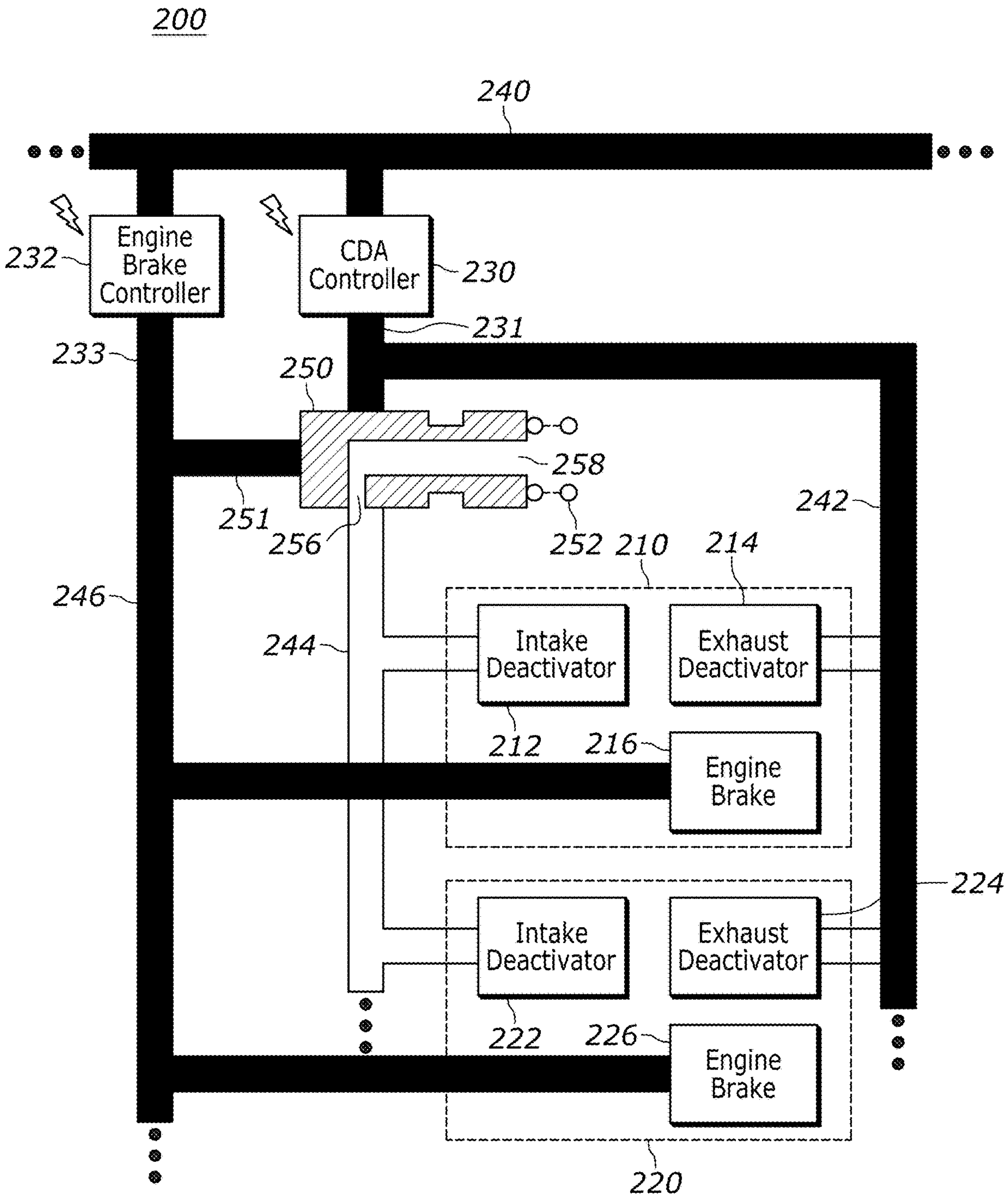

As shown in FIG. 5, subsequent to (or, once again, at least no earlier than) activation (energization) of the engine brake controller 232, the CDA controller 230 is also activated (energized) to output hydraulic fluid from its output port 231 to the exhaust hydraulic fluid manifold 242 as shown. At the same time, the presentation of pressurized hydraulic fluid at the control input 251 of the spool valve 250 via the engine brake hydraulic fluid manifold 246 causes the biasing force of the spool valve spring 252 to be overcome, thereby permitting the spool valve 250 to assume its second or activated position as further shown in FIG. 5. As a result, the venting port 256 of the spool valve 250 is aligned with the intake hydraulic fluid manifold 244, which is then permitted to vent any hydraulic fluid therein out through the vent channel 258, thereby permitting the intake deactivators 212, 222 to remain in (or switch back to) their unlocked/motion absorbing state despite activation of the CDA controller 230. Because the venting port 256 only permits venting of the intake hydraulic fluid manifold 244, whereas the exhaust hydraulic fluid manifold 242 is sealed off from the intake hydraulic fluid manifold 244 and vent channel 258 by the spool valve 250, the required provision of main intake valve events and simultaneous inhibition of main exhaust valve events required for 1.5-stroke CR engine braking is provided.

The illustrations of FIGS. 2-5 depict the CDA controller 230/engine brake controller 232 paired to control operation of two engine cylinders 210, 220. However, it is appreciated that such a controller pair may be used to control only once cylinder or more than two cylinders (as depicted by the ellipses relative to the manifolds 242, 244, 246). For example, in a six-cylinder engine, a single CDA controller/engine brake controller pair may be used to control operation as described above for all six cylinders of the engine. Alternatively, it is also possible to provide multiple CDA controller/engine brake controller pairs each associated with a subgroup of cylinders. For example, and again with reference to a six-cylinder engine, a first CDA controller/engine brake controller pair may be configured to control cylinders 1-3, whereas a second CDA controller/engine brake controller pair may be configured to control cylinders 4-6, or three CDA controller/engine brake controller pairs could be provided to respectively control cylinders 1 and 2 as first group, cylinders 3 and 4 as a second group and cylinders 5 and 6 as a third group. Still other configurations, dependent upon the number of cylinders and the engine braking requirements of the engine, will be apparent to those skilled in the art.

Figure 6:
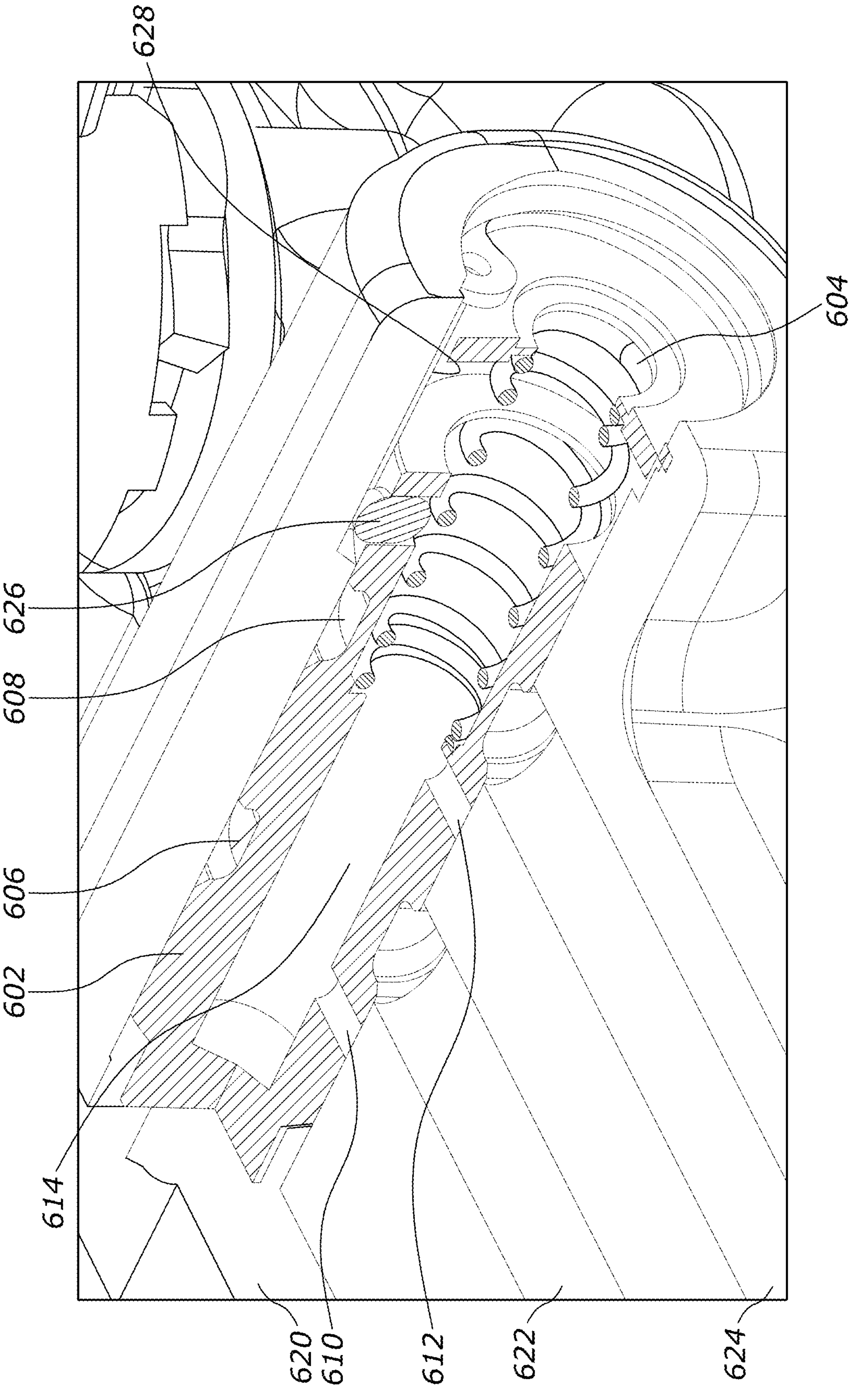
FIGS. 6 and 7 illustrate an example of a braking-dependent deactivator controller in the form of a two-channel venting spool valve and operation thereof in accordance with the instant disclosure.
Figure 7:
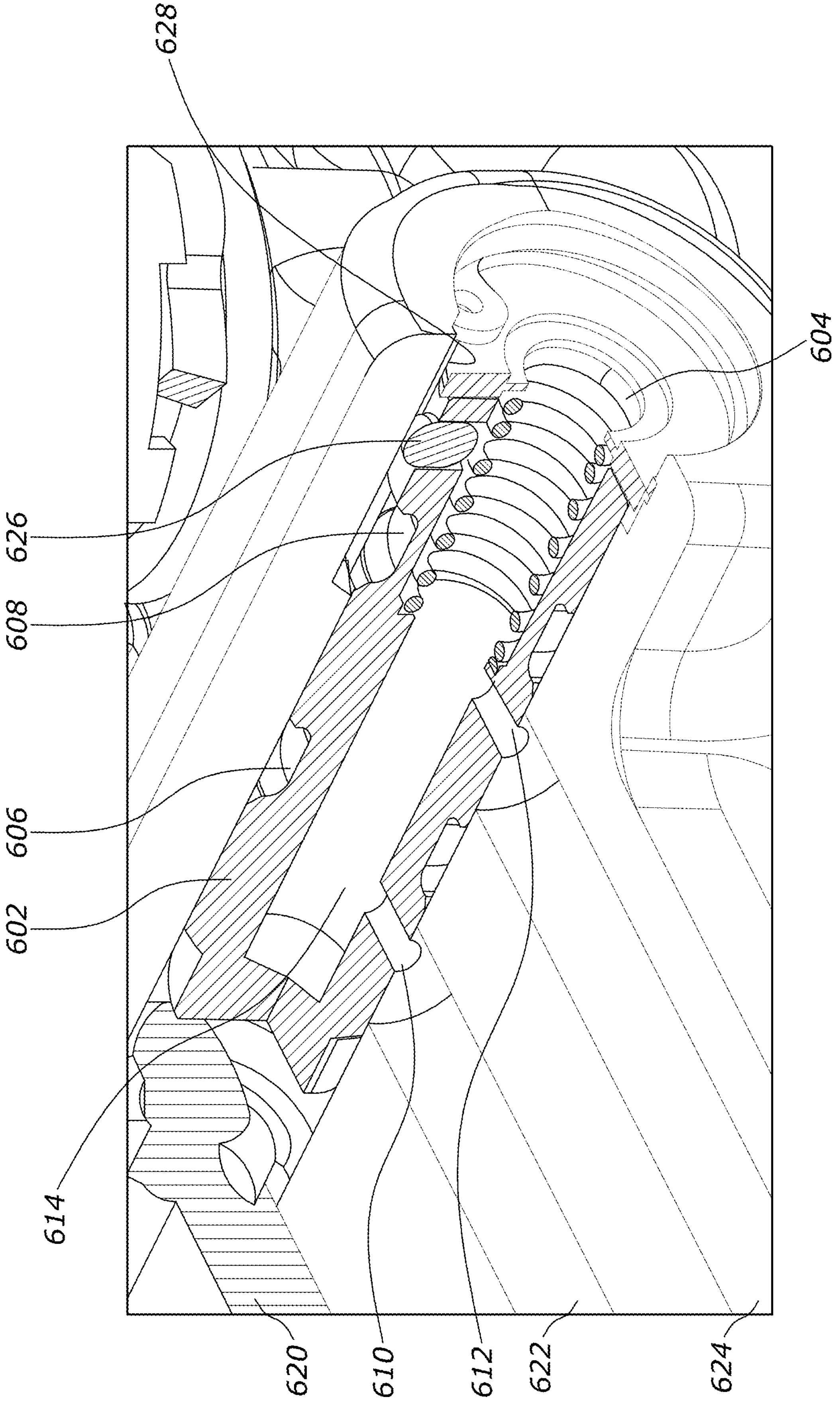

Further still, it is appreciated that a single CDA controller/engine brake controller pair could control multiple subgroups of cylinders through a single spool valve equipped with multiple annular ports and venting ports. An example of such an embodiment is illustrated with reference to FIGS. 6 and 7. In particular, FIGS. 6 and 7 illustrate a spool valve 602 having a spool valve spring 604 operatively connected to the rightmost end (as depicted in FIGS. 6 and 7) of the spool valve 602. In this embodiment, in addition to a vent channel 614 established in the interior of the spool valve 602, a pair of annular ports 606, 608 and a pair of venting ports 610, 612 are also provided as shown. Additionally, a leftmost end of the spool valve 602 is configured to be in fluid communication with an engine brake hydraulic fluid manifold 620. A first intake hydraulic fluid manifold 622 and a second intake hydraulic fluid manifold 624 are also depicted. The first intake hydraulic fluid manifold 622 may be operatively connected (in a manner similar to that depicted in FIGS. 2-5) to intake deactivators corresponding to a first group of one or more cylinders, whereas the second intake hydraulic fluid manifold 624 may be operatively connected to intake deactivators corresponding to a second group of one or more cylinders. Although not shown in FIGS. 6 and 7, corresponding first and second exhaust hydraulic fluid manifolds (operatively connected to exhaust deactivators for the first and second groups of cylinders and aligned with respective ones of the first and second intake hydraulic fluid manifolds 622, 624) may also be provided.

As shown in FIG. 6, the spool valve 602 is maintained in its default position in the absence of hydraulic fluid in the engine brake hydraulic fluid manifold 624 such that the annular ports 606, 608 are aligned with respective ones of the first intake hydraulic fluid manifold 622 and the second intake hydraulic fluid manifold 624. As described above, when hydraulic fluid is provided by a first CDA controller for the first intake/exhaust hydraulic fluid manifolds and a second CDA controller for the second intake/exhaust hydraulic fluid manifolds, the default position of the spool valve 602 will permit hydraulic fluid to flow into both the first intake hydraulic fluid manifold 622 and the second intake hydraulic fluid manifold 624.

However, as depicted in FIG. 7, provision of hydraulic fluid in the engine braking hydraulic fluid manifold 620 causes the spool valve 602 to translate to its activated position. As a result, a first venting port 610 is aligned with the first intake hydraulic fluid manifold 622, and a second venting port 612 is aligned with the second intake hydraulic fluid manifold 624, thereby allowing hydraulic fluid in the intake hydraulic fluid manifolds 622, 624 to vent through their respective venting ports 610, 612 and the venting channel 614.

FIGS. 6 and 7 also illustrate a key channel 628 longitudinally defined along an inner surface of a bore in which the spool valve 602 is slidably disposed and a corresponding key 626. The key 626, which is supported by the spool valve 602, is aligned with and travels within the key channel 628 as the spool valve 602 translates within its bore, thereby preventing rotation of the spool valve 602 within the bore. By preventing rotation of the spool valve 602 in its bore, proper alignment of the venting ports 610, 612 with the corresponding first intake hydraulic fluid manifold 622 and second intake hydraulic fluid manifold 624 is ensured. In an alternative embodiment, the venting ports 610, 612 may comprise multiple, circumferentially-spaced and radially-extending passages (similar to those depicted in FIGS. 6 and 7) aligned with each other along a longitudinal axis of the spool valve 602 and in fluid communication with the venting channel 614. If the circumferential spacing of such venting ports 610, 612 is sufficiently close so as to ensure fluid communication between at least one of each of the venting ports 610, 612 and the corresponding first intake hydraulic fluid manifold 622 and second intake hydraulic fluid manifold 624 regardless of rotation of the spool valve 602, the key 626 and key channel 628 may not be required.

It is also noted that the venting ports 256, 610, 612 illustrated in the instant disclosure are all shown having diameters or cross-sectional areas that are less than the diameters or cross-sectional areas of the intake hydraulic fluid manifolds 244, 622, 624 with which they periodically align. This is done to ensure the controlled venting of hydraulic fluid from such manifolds.

Figure 9:
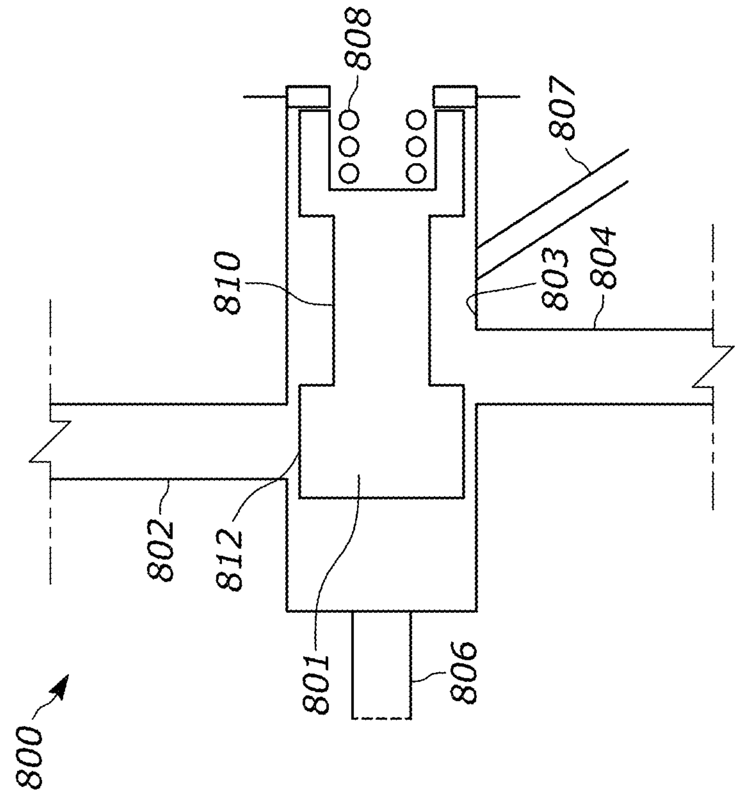
FIGS. 8 and 9 schematically illustrate an alternate embodiment of a spool valve in accordance with the instant disclosure.
Figure 8:
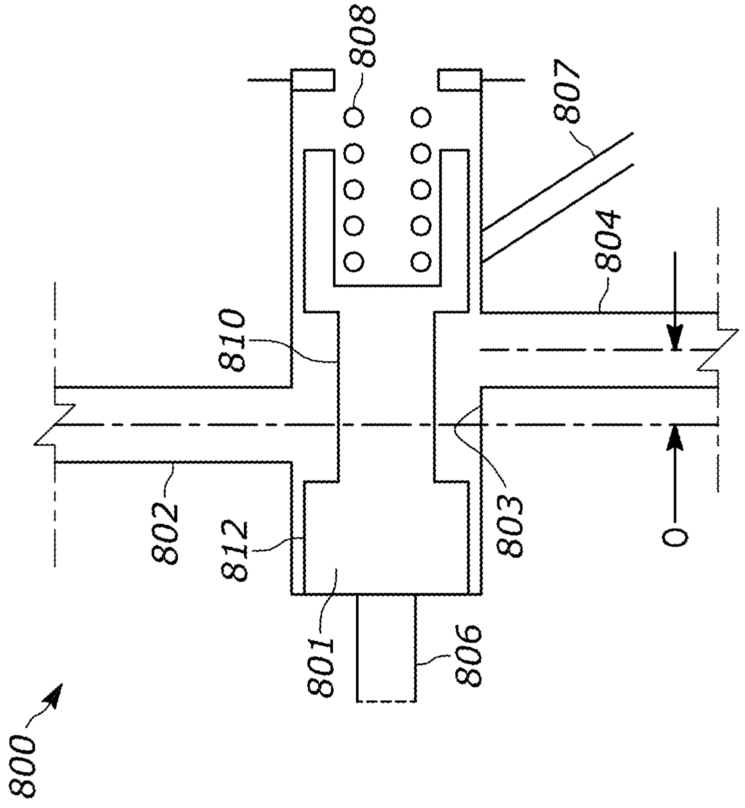

FIGS. 8 and 9 illustrate an alternative embodiment of a spool valve 800 in accordance with the instant disclosure. As opposed to the spool valves 250, 602 illustrated in FIGS. 2-7, the spool valve 800 includes an annular port 810 but does not include venting ports 256, 610, 612 nor the associated vent channels 258, 614. As before, the spool valve 800 comprises a spool 801 slidably disposed in a spool valve bore 803. The spool valve bore 803 is operatively connected to and in fluid communication with a CDA deactivator controller via a first hydraulic passage 802, a second hydraulic passage (i.e., intake hydraulic fluid manifold) 804 and the engine braking controller via a control input 806 as shown. In this case, however, the first hydraulic passage 802 and the second hydraulic passage 804 are offset from each other, by as distance O, as shown. Additionally, the spool valve bore 803 is in fluid communication with a vent passage 807 that may be, for example, open to atmospheric pressure.

The annular port 810 is configured such that, when hydraulic fluid is not applied to the control input 806 of the spool valve 800, i.e., when the spool valve 800 is in its first or default position under bias applied by a spool valve spring 808 as shown in FIG. 8, the annular port 810 is sufficiently wide to permit fluid communication between the first and second hydraulic passages 802, 804 notwithstanding the offset therebetween. On the other hand, when hydraulic fluid is applied to the spool valve 800 via the control input 806, i.e., when the spool valve 800 is in its second or activated position as shown in FIG. 9, the first passage 802 is sealed off by a land portion 812 of the spool 801. However, the annular port 810 remains aligned with the second fluid passage 804 and further with the vent passage 807. The fluid communication provided by the annular port 810 between the second hydraulic passage 804 and the vent passage 803 permits an hydraulic fluid in the second passage (i.e., the intake hydraulic fluid manifold) 804 to be vented.

While the various embodiments in accordance with the instant disclosure have been described in conjunction with specific implementations thereof, it is evident that many alternatives, modifications and variations will be apparent to those skilled in the art. Accordingly, the preferred embodiments of the invention as set forth herein are intended to be illustrative only and not limiting so long as the variations thereof come within the scope of the appended claims and their equivalents.

What is claimed is:

1. A system for controlling valve motion to facilitate cylinder deactivation operation and 1.5-stroke engine braking operation in an internal combustion engine having at least two cylinders, each of the at least two cylinders comprising at least one intake valve and corresponding hydraulically-controlled intake deactivator, at least one exhaust valve and corresponding hydraulically-controlled exhaust deactivator and a hydraulically-controlled engine braking actuator, the system comprising:

a cylinder deactivation controller operatively connected to and in fluid communication with the intake deactivators and the exhaust deactivators for the at least two cylinders;

an engine braking controller operatively connected to and in fluid communication with the engine braking actuators for the at least one cylinder; and a braking-dependent deactivator controller disposed between and in fluid communication with the cylinder deactivation controller and the intake deactivators for the at least two cylinders, and in fluid communication with the engine braking controller via a control input of the braking-dependent deactivator controller, wherein the braking-dependent deactivator controller, according to hydraulic fluid selectively applied to the control input by the engine braking controller, is configured in a first state to permit hydraulic fluid flow in hydraulic fluid control passages for the intake deactivators for the at least two cylinders when in a non-1.5-stroke engine braking mode, and further configured in a second state to vent the hydraulic fluid control passages for the intake deactivators for the at least two cylinders when in a 1.5-stroke engine braking mode.

2. The system of claim 1, wherein the cylinder deactivator controller and the engine braking controller comprise normally off solenoids.

3. The system of claim 1, wherein the intake deactivators for the at least two cylinders and exhaust deactivators comprise normally locked/motion conveying lost motion components.

4. The system of claim 3, wherein the engine braking actuators comprise normally unlocked/motion absorbing lost motion components.

5. The system of claim 1, further comprising:

an engine controller operatively coupled to the cylinder deactivation controller and the engine braking controller, and operative, when initiating the 1.5-stroke engine braking mode, to cause activation of the cylinder deactivation controller no earlier than activation of the engine braking controller.

6. The system of claim 5, wherein the engine controller is further operative, when initiating the 1.5-stroke engine braking mode, to cause activation of the cylinder deactivation controller after activation of the engine braking controller.

7. The system of claim 1, wherein the braking-dependent deactivator controller comprises a spool valve configured to operate in a first position in which fluid communication is provided between the cylinder deactivation controller and the intake deactivators for the at least two cylinders, and further configured to operate in a second position in which the intake deactivators for the at least two cylinders are in fluid communication with a vent passage.

8. The system of claim 7, wherein the vent passage comprises a central bore formed in the spool valve.

9. The system of claim 7, wherein the spool valve comprises a spool slidably disposed in a spool valve bore, the spool valve bore in fluid communication with the cylinder deactivator controller via a first hydraulic passage and in fluid communication with the intake deactivators for the at least two cylinders via a second hydraulic passage having an offset alignment with the first hydraulic passage, the spool valve bore further in fluid communication with the vent passage, wherein the spool, when operated in first position, provides fluid communication between the first and second hydraulic passages while occluding the vent passage and, when operated in the second position, provides fluid communication between the second hydraulic passage and the vent passage while occluding the first hydraulic passage.

10. A system for controlling valve motion to facilitate cylinder deactivation operation and 1.5-stroke engine braking operation in an internal combustion engine having at least one cylinder, each of the at least one cylinder comprising at least one intake valve and corresponding hydraulically-controlled intake deactivator, at least one exhaust valve and corresponding hydraulically-controlled exhaust deactivator and a hydraulically-controlled engine braking actuator, the system comprising:

a cylinder deactivation controller operatively connected to and in fluid communication with the intake deactivators and the exhaust deactivators for the at least one cylinder;

an engine braking controller operatively connected to and in fluid communication with the engine braking actuators for the at least one cylinder; and a braking-dependent deactivator controller disposed between and in fluid communication with the cylinder deactivation controller and the intake deactivators, and in fluid communication with the engine braking controller via a control input of the braking-dependent deactivator controller, wherein the braking-dependent deactivator controller, according to hydraulic fluid selectively applied to the control input by the engine braking controller, is configured in a first state to permit hydraulic fluid flow in hydraulic fluid control passages for the intake deactivators when in a non-1.5-stroke engine braking mode, and further configured in a second state to vent the hydraulic fluid control passages for the intake deactivators when in a 1.5-stroke engine braking mode, wherein the braking-dependent deactivator controller comprises a spool valve configured to operate in a first position in which fluid communication is provided between the cylinder deactivation controller and the intake deactivators, and further configured to operate in a second position in which the intake deactivators are in fluid communication with a vent passage, wherein the vent passage comprises a central bore formed in the spool valve.

11. The system of claim 10, wherein the intake deactivators and exhaust deactivators comprise normally locked/motion conveying lost motion components.

12. The system of claim 11, wherein the engine braking actuators comprise normally unlocked/motion absorbing lost motion components.

13. The system of claim 10, further comprising:

an engine controller operatively coupled to the cylinder deactivation controller and the engine braking controller, and operative, when initiating the 1.5-stroke engine braking mode, to cause activation of the cylinder deactivation controller no earlier than activation of the engine braking controller.

14. The system of claim 13, wherein the engine controller is further operative, when initiating the 1.5-stroke engine braking mode, to cause activation of the cylinder deactivation controller after activation of the engine braking controller.

15. A system for controlling valve motion to facilitate cylinder deactivation operation and 1.5-stroke engine braking operation in an internal combustion engine having at least one cylinder, each of the at least one cylinder comprising at least one intake valve and corresponding hydraulically-controlled intake deactivator, at least one exhaust valve and corresponding hydraulically-controlled exhaust deactivator and a hydraulically-controlled engine braking actuator, the system comprising:

a cylinder deactivation controller operatively connected to and in fluid communication with the intake deactivators and the exhaust deactivators for the at least one cylinder;

an engine braking controller operatively connected to and in fluid communication with the engine braking actuators for the at least one cylinder; and a braking-dependent deactivator controller disposed between and in fluid communication with the cylinder deactivation controller and the intake deactivators, and in fluid communication with the engine braking controller via a control input of the braking-dependent deactivator controller, wherein the braking-dependent deactivator controller, according to hydraulic fluid selectively applied to the control input by the engine braking controller, is configured in a first state to permit hydraulic fluid flow in hydraulic fluid control passages for the intake deactivators when in a non-1.5-stroke engine braking mode, and further configured in a second state to vent the hydraulic fluid control passages for the intake deactivators when in a 1.5-stroke engine braking mode, wherein the braking-dependent deactivator controller comprises a spool valve configured to operate in a first position in which fluid communication is provided between the cylinder deactivation controller and the intake deactivators, and further configured to operate in a second position in which the intake deactivators are in fluid communication with a vent passage, wherein the spool valve comprises a spool slidably disposed in a spool valve bore, the spool valve bore in fluid communication with the cylinder deactivator controller via a first hydraulic passage and in fluid communication with the intake deactivators via a second hydraulic passage having an offset alignment with the first hydraulic passage, the spool valve bore further in fluid communication with the vent passage, wherein the spool, when operated in first position, provides fluid communication between the first and second hydraulic passages while occluding the vent passage and, when operated in the second position, provides fluid communication between the second hydraulic passage and the vent passage while occluding the first hydraulic passage.

16. The system of claim 15, wherein the cylinder deactivator controller and the engine braking controller comprise normally off solenoids.

17. The system of claim 15, wherein the intake deactivators and exhaust deactivators comprise normally locked/motion conveying lost motion components.

18. The system of claim 17, wherein the engine braking actuators comprise normally unlocked/motion absorbing lost motion components.

19. The system of claim 15, further comprising:

an engine controller operatively coupled to the cylinder deactivation controller and the engine braking controller, and operative, when initiating the 1.5-stroke engine braking mode, to cause activation of the cylinder deactivation controller no earlier than activation of the engine braking controller.

20. The system of claim 19, wherein the engine controller is further operative, when initiating the 1.5-stroke engine braking mode, to cause activation of the cylinder deactivation controller after activation of the engine braking controller.

* * * * *